No. 876,360. PATENTED JAN. 14, 1908.
H. P. KRAFT.
FEEDING MECHANISM FOR LATHES OR OTHER DEVICES.
APPLICATION FILED AUG. 13, 1904.
3 SHEETS—SHEET 1.
FIG. 1
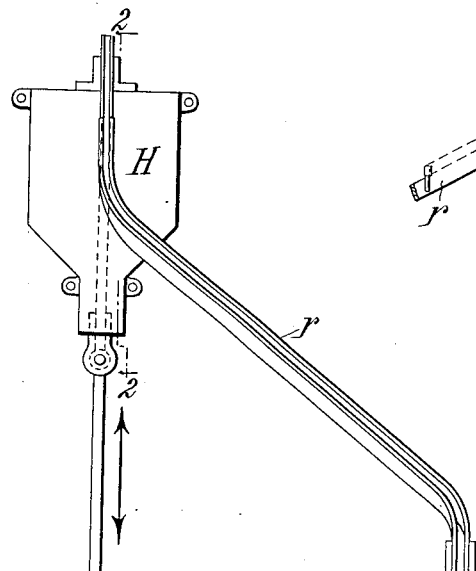
FIG. 2.
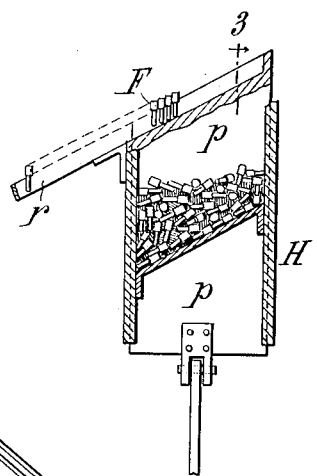
FIG. 3.
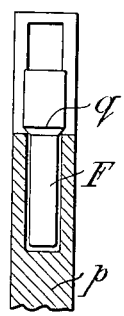
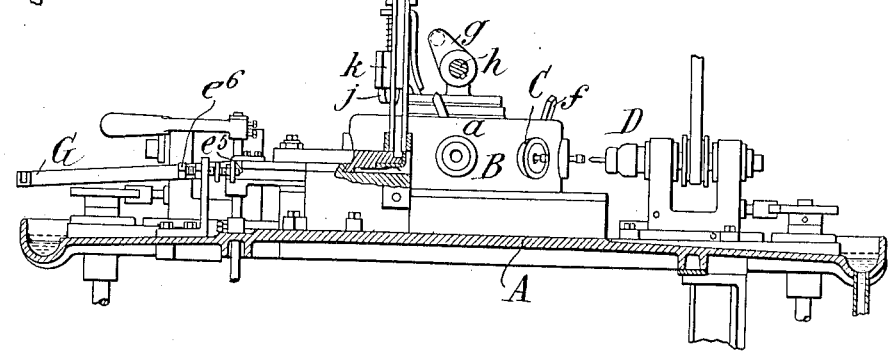
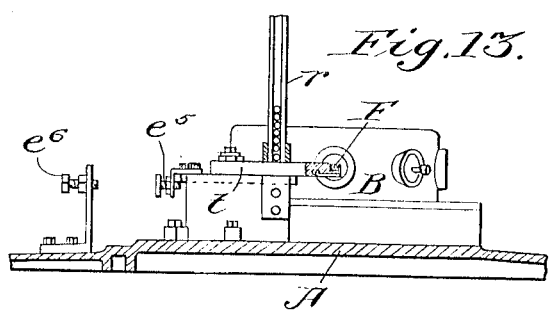
Fig. 13.
WITNESSES:
René Bruine
Theodore T. Snell.
INVENTOR:
Henry P. Kraft
By Attorneys,
Arthur E. Fraser & Co.

No. 876,360.

PATENTED JAN. 14, 1908.

H. P. KRAFT.
FEEDING MECHANISM FOR LATHES OR OTHER DEVICES.
APPLICATION FILED AUG. 13, 1904.

3 SHEETS—SHEET 2.

WITNESSES:
René Muine
Theodore T. Snell.

INVENTOR:
Henry P. Kraft
By Attorneys,
Arthur E. Fraser & Co.

No. 876,360.
PATENTED JAN. 14, 1908.
H. P. KRAFT.
FEEDING MECHANISM FOR LATHES OR OTHER DEVICES.
APPLICATION FILED AUG. 13, 1904.
3 SHEETS—SHEET 3.
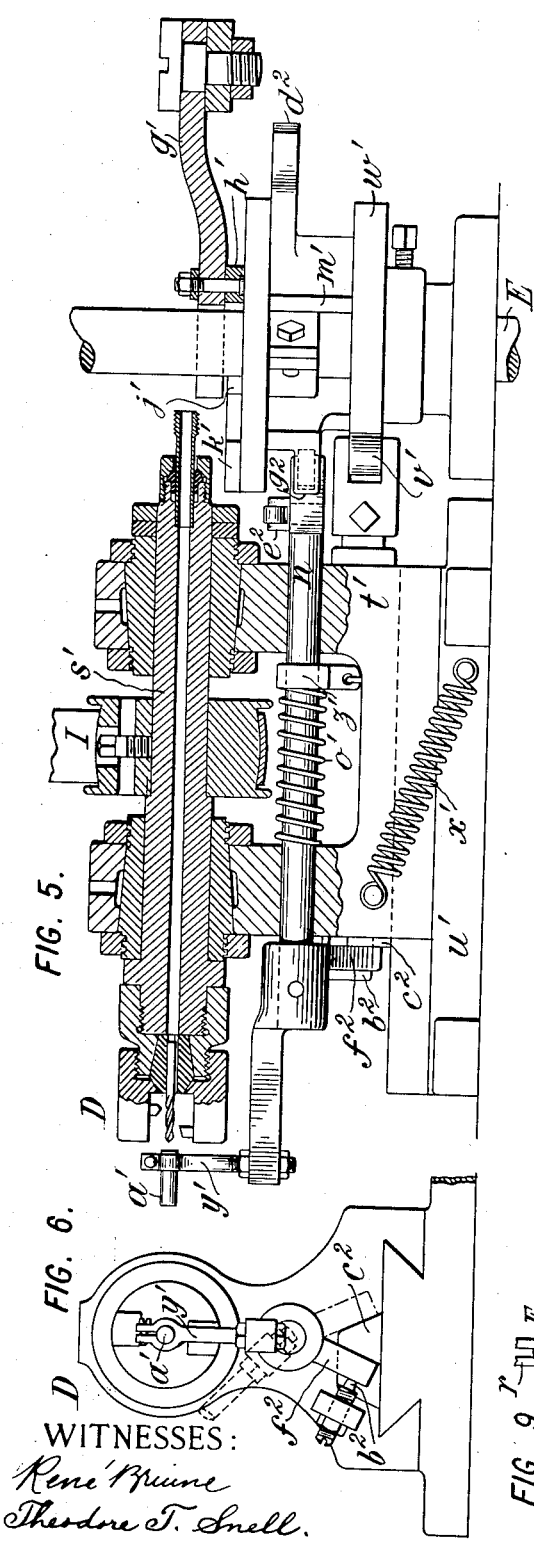
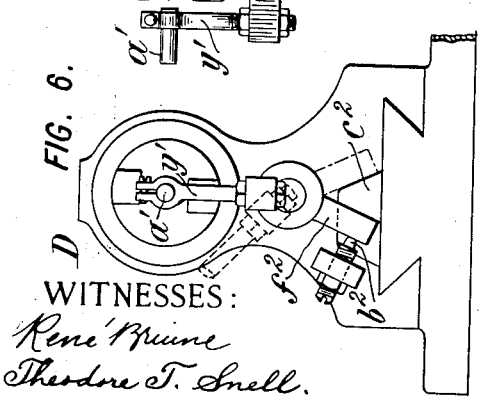
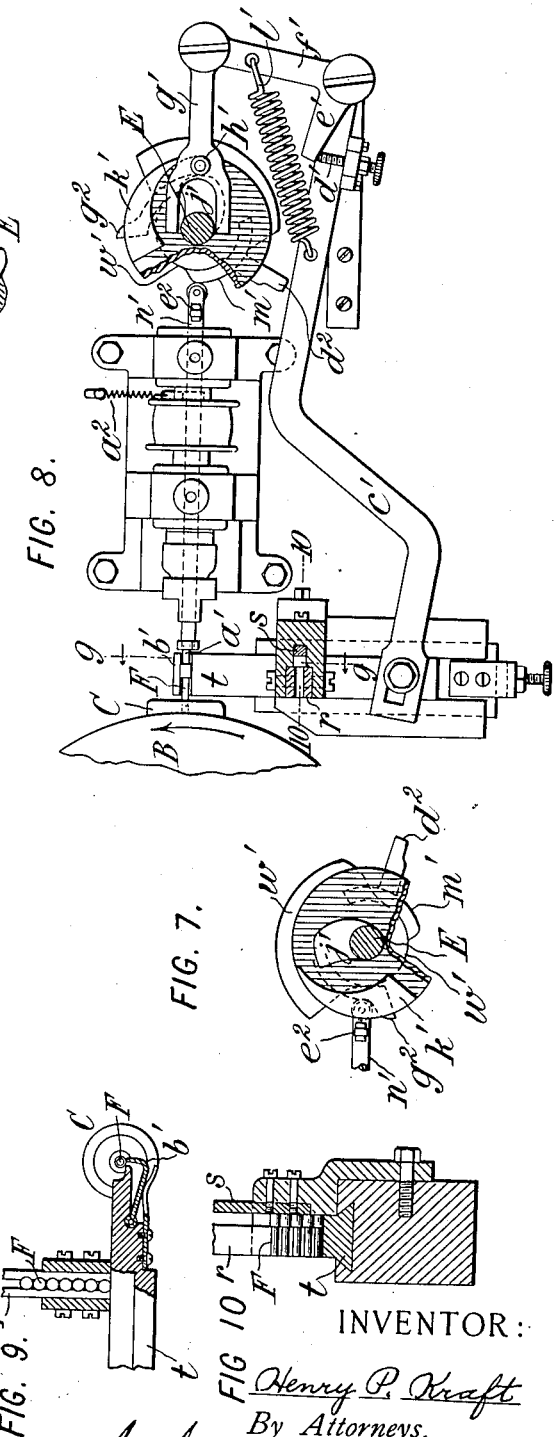
WITNESSES:
René Bruine
Theodore T. Snell.
INVENTOR:
Henry P. Kraft
By Attorneys,
Arthur E. Fraser & Co.

UNITED STATES PATENT OFFICE.

HENRY P. KRAFT, OF NEW YORK, N. Y.

FEEDING MECHANISM FOR LATHES OR OTHER DEVICES.

No. 876,380.

Specification of Letters Patent.

Patented Jan. 14, 1908.

Application filed August 13, 1904. Serial No. 220,686.

*To all whom it may concern:*

Be it known that I, HENRY P. KRAFT, a citizen of the United States, residing in the borough of Manhattan, city, county, and State of New York, have invented certain new and useful Improvements in Feeding Mechanism for Lathes or other Devices, of which the following is a specification.

This invention relates to feeding mechanism for lathes or other devices, and aims to provide certain improvements therein.

My invention is especially directed to mechanism for feeding cylindrical metal blanks to a chuck or other holding device, and as applied to a turret lathe (to which it is particularly adapted) preferably includes a device for taking the blanks from a suitable receptacle in which they are indiscriminately placed, and arranging them in orderly succession in a magazine, a transferring mechanism for taking each blank in turn from the magazine and conveying it to a point opposite the chuck or holding device and a pusher adapted to move the blank from the transferrer to the chuck, after which the latter automatically closes upon the blank.

My invention also includes certain details of construction which will be hereinafter more fully referred to.

Figure 12:
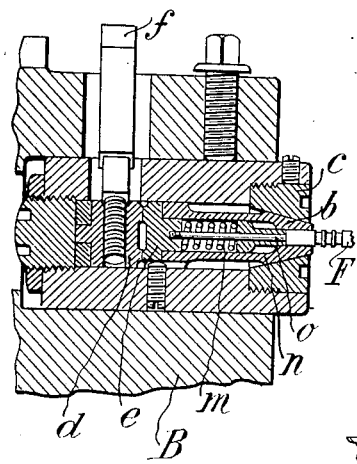
Figure 4:
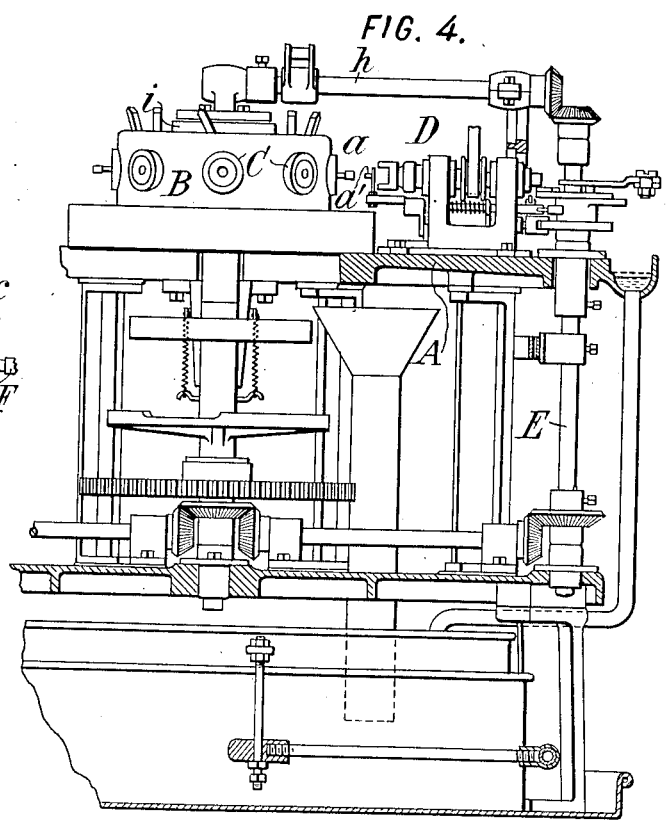
Figure 11:
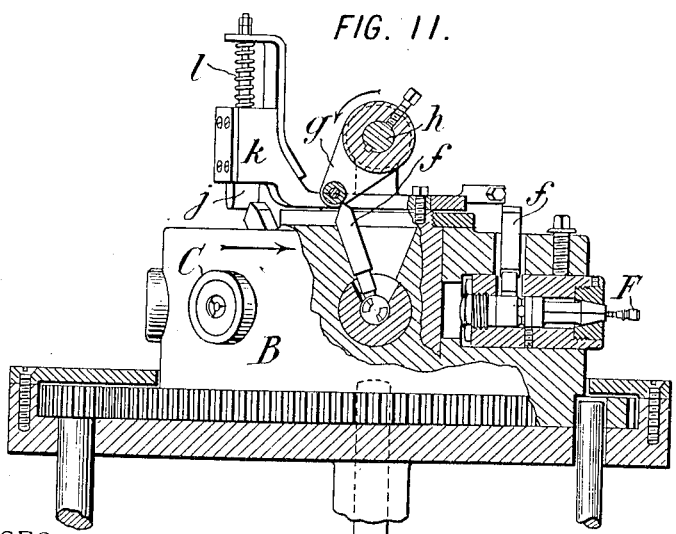

Referring to the drawings, which illustrate my invention as applied to a turret lathe, Figure 1 is an elevation partly in section, showing the magazine and connected parts; Fig. 2 is a section on the line 2—2 in Fig. 1; Fig. 3 is a section on the line 3—3 in Fig. 2; Fig. 4 is an elevation, partly in section, taken approximately at right-angles to Fig. 1, and illustrating the pushing device; Fig. 5 is an elevation, partly in longitudinal vertical section, showing the pushing device illustrated in Fig. 4; Fig. 6 is an end elevation of Fig. 5, looking to the right; Fig. 7 is a plan illustrating the cams of Fig. 5; Fig. 8 is a plan of Fig. 5, with the cams in another position; Figs. 9 and 10 are sections of the feeding mechanism taken on the lines 9—9 and 10—10, respectively, of Fig. 8; Fig. 11 is a view of the turret of the lathe partly in section, and illustrating the means for opening and closing the chuck; Fig. 12 is an enlarged detail view of one of the chucks. Fig. 13 is an elevation partly in section showing the turret and carrier, with the latter in its forward position.

Referring to the drawings, let A indicate the table of a turret lathe, having a series of tools adapted, for instance, to form a tire valve shell from a metal blank or "rivet". A rotary turret B in the present instance carries a series of work holding chucks, means being provided for intermittently rotating the turret to successively present each blank to the action of the various tools which are required to produce the finished article. The blanks or rivets are fed into the chucks as they arrive opposite a certain point in the rotation of the turret (which point may be that at which one of the tools operates, or not) such point being indicated in Figs. 1 and 4 by the letter $a$. The series of tools D, D, perform the necessary boring, tapping, grooving or other operations upon the blank as it arrives at the position to be operated upon by each.

Each of the chucks C as it moves from the last tool around toward the feeding position is adapted to be opened to expel the finished shell or other article, and to receive a fresh blank. While any suitable mechanism may be provided for this purpose I prefer that shown, in which each of the chucks is provided with an arm arranged to oscillate and thereby to open and close the jaws of the chuck. At the end of the series of operations this arm engages a stop in its path which swings it backward so as to open the chuck, whereupon the work is ejected. The chuck remains open until a new blank is inserted, whereupon the chuck-operating arm is struck by another arm moving in the same direction so as to swing it forward and effect the closure of the chuck on the blank. Preferably means are provided carried by the chuck for automatically ejecting the work upon opening the jaws. As embodied in the present machine the chuck and operating mechanisms therefor are best illustrated in Figs. 11 and 12. The usual split spring jaws $b$ are squeezed together by being moved outwardly through the tapered ring $c$, and upon being released force themselves back into the ring and separate so as to release the work. For closing the jaws I provide a pivoted cam plate $d$ on which is a pair of cam faces bearing against similar or suitable faces on a rear plate $e$ to which the jaws $b$ are attached. A chuck-operating arm $f$ projects out of the cam plate $d$ and a slight distance above the top of the turret. As this arm is moved forward (see the arrow in Fig. 11) the jaws are forced forward and together, this movement taking place simultaneously with or immediately after the insertion of the blank. For obtaining this forward movement of the chuck-operating arm $f$ I provide an arm $g$ which is carried on a shaft $h$ (Figs. 1, 4 and 11) supported in bearings at its outer end upon a bracket projecting up from the table and at its inner end upon a vertical boss $i$ extending up from the table through the center of the turret. The shaft $h$ is rotated continuously by a bevel gear connection with a shaft E, at its outer end. This action takes place while the turret is stationary, and any arm moving in the forward direction might be substituted in place of the special arm $g$ shown. In order to swing the arm $f$ back again after the series of operations a stop $j$ is provided which is substantially fixed, being carried in a bracket $k$ attached on the central fixed boss $i$. The stop $j$ ordinarily stands directly in the path of the arm $f$, and as the turret turns the arm engages the stop and is turned backward. The stop $j$ is arranged to move upward out of the way of the arm $f$ as the latter forces its way past, a spring $l$ serving to hold the stop down with sufficient force to effect the turning of the chuck-operating arm before it rises.

Within each of the chucks is illustrated a spring $m$ which is compressed by the introduction of a blank F and which is held compressed as long as the jaws of the chuck hold the blank F in position, but which upon the opening of the jaws forcibly ejects the blank. Preferably the spring bears against the blank through the intermediation of a ring $n$, and a pin $o$ is provided for limiting the inward position of the blank and for guiding the ring $n$. The mechanism is so timed that at the moment of release of the blank from the jaws of the chuck the blank will be opposite the discharge chute G (Fig. 1). Consequently the finished articles are expelled one after another forcibly through the chute G to a point outside of the machine.

The magazine and mechanism for delivering the blanks continuously and in proper position to the feeding mechanism is illustrated in Figs. 1, 2 and 3. The box H constituting the receptacle tapers from two sides toward the center, as shown in Fig. 1, and also extends obliquely downward from its rear to its front, as shown in Fig. 2. A member such as the slide $p$ for example reciprocates vertically in the receptacle, and is provided at its upper edge with a groove, as shown, which engages the shoulders $q$ of the blanks in the box when the upper edge of the plate or slide is depressed. The smaller but heavier portions of the blanks swing down into the groove in the manner illustrated. The groove and the upper edge of the slide are oblique, so that as the slide is lifted to its highest position (Fig. 2) such of the blanks as have been caught slide down to the lower end of the groove and thence out into the trough $r$ whose upper end registers with the lower end of the groove in the slide $p$, and which consists merely of two parallel plates. In the trough $r$ the blanks are held by their shoulders the same as in the slide until near the lower end where they are gradually turned to a horizontal position, as shown in Figs. 9 and 10. In this lower portion of the trough a guard plate $s$ is arranged opposite the larger ends of the blanks to prevent them falling out, and constituting with the sides $r$ a magazine.

The blanks are taken one by one from the lower end of the trough $r$ by means of a transverse slide $t$ provided with a groove at one end. When the slide $t$ is retracted the groove lies immediately under the vertical line of blanks and the lower blank drops into the groove. The slide is then advanced until the blank is opposite the center of the chuck (Fig. 8). Thereupon a pin $a'$ is projected against the blank and forces it into the chuck, and is later withdrawn. The slide $t$ is almost immediately retracted, and in order to permit it to pass the head of the blank F the outer end of the slide is composed of a yielding plate $b'$ which is automatically depressed by the blank so that it passes under the latter, as shown in Fig. 9. The movement of the slide $t$ is produced by a swinging arm $c'$ pivoted at its outer end and moved positively in the retracting direction by the engagement of an adjustable stop $d'$ thereon with an arm $e'$ on a bell crank lever, the other arm $f'$ of which carries a forked link $g'$ straddling the shaft E, and carrying a roller $h'$ which is alternately forced outward by a cam $j'$ and inward by a cam $k'$, both on a plate which is rotated with the shaft E. The cam $k'$ effects an inward movement of the roller $h'$ and by the action of the arm $e'$ on the stop $d'$ effects a retractive movement of the slide $t$. The cam $j'$ causes an outward movement of the roller $h'$ and the movement is transmitted yieldingly through the spring $l'$ to produce a forward movement of the slide $t$. Lower down on the shaft E is a cam $m'$ which substantially simultaneously with the completed action of the cam $j'$ on the slide $t$ acts upon a rod $n'$ to push it forward and with it the pin $a'$ previously referred to, a spring $o'$ serving to retract the rod $n$ after the cam has passed. The cam $m'$ holds the pin $a'$ forward against the blank while the slide $t$ is being retracted by the cam $k'$, thus holding the blank firmly in the chuck. An adjustable stop $e^6$ on the table A coacting with a similar stop $e^5$ upon the carrier, serves to limit the backward movement of the slide.

In the present construction it will be noted that the feeding mechanism is designed to operate at a point in line with one of the tools D (see Figs. 5 and 6), and it is necessary in such construction to remove the pushing pin $a'$ out of its position before the advance of the tool. The mechanism shown for accomplishing this I will describe in connection with the operation of the tool, which is shown as a cutting and drilling tool having a forward and backward movement while rotating to act upon the work. The central shaft $s'$ of the tool is rotated by means of a belt I, as shown, and is carried in bearings on a slide $t'$ sliding on a fixed base $u'$. The slide $t'$ carries at its rear a cam roller $v'$ in engagement with a cam $w'$ carried by the shaft E. This cam at the proper time advances the slide $t'$ until the tools properly engage the blank and perform their work. A pair of springs $x'$ on opposite sides retract the slide as the cam $w'$ permits. The pin $a'$ first stands directly in line with the center of the shaft $s'$ and pushes the blank into the chuck. Then it swings to the side so that in the further advance it will not strike the projection portion of the chuck C, the lateral position being indicated in dotted lines in Fig. 6. This pin is carried on an arm $y'$ of the shaft $n'$, previously referred to, which shaft is provided with a sleeve $z'$ to the lower end of which is attached a spring $a^2$ (Fig. 8) which tends always to pull the shaft around until the arm $y'$ is in an upright position. At the front of the slide $t'$ are a pair of stops $b^2$ and $c^2$ which determine the angular position of the arm $y'$.

Starting with the parts in the position shown in full lines in Fig. 6, the shaft $n'$ is engaged by the cam $m'$ as explained and pushed forward slightly. A little later a second cam $d^2$ integral with the cam $m'$ engages an arm $e^2$ on the shaft $n'$ so as to turn the shaft to the angular position indicated in dotted lines in Fig. 6. Thereupon the spring $o'$ pulls the shaft back and the depending arm $f^2$ is engaged by the stop $c^2$ on the face of the slide $t'$ to prevent a return of the shaft to its former angular position. The lowest cam $w'$ then pushes the slide forward, and the continuous rotation of the tool shaft causes the tool to act upon the blank. Shortly after the action of the cam $w'$ has ceased and the tool has been withdrawn by the springs $x'$ another cam $g^2$ in the plane of the shaft $n'$ presses the latter forward, and the spring $a^2$ simultaneously turns it to its original position, the adjustable stop $b^2$ acting against the lower arm $f^2$ to determine this position accurately. The parts are then ready for another operation.

Although I have described in detail the preferred embodiment of my invention it will be understood that I do not wish to be limited thereto, as the construction shown is susceptible of considerable modification without departing from my invention.

I claim as my invention the following defined novel features, substantially as hereinbefore specified, namely.

1. Means for feeding blanks to a chuck, comprising in combination a magazine adapted to carry a number of said blanks, a reciprocating member for carrying one blank at a time from said magazine to a position in line with the chuck, a pusher adapted to push said blank from said member into the chuck and means for holding said pusher against said blank while said member is being withdrawn.

2. Means for feeding blanks to a chuck, comprising in combination a magazine adapted to carry a number of said blanks, a horizontally reciprocating grooved slide arranged to carry one blank at a time from said magazine to a position in line with the chuck, and means for pushing the blank into engagement with the chuck, the forward wall of said groove being arranged to yield in the retracting movement of said slide to permit said wall to pass under said blank.

In witness whereof, I have hereunto signed my name in the presence of two subscribing witnesses.

HENRY P. KRAFT.

Witnesses:
 EUGENE V. MYERS,
 THOMAS F. WALLACE.